(12) United States Patent
Shibasaki et al.

(10) Patent No.: US 11,567,215 B2
(45) Date of Patent: Jan. 31, 2023

(54) POSITION INFORMATION PROCESSING SYSTEM AND POSITION INFORMATION PROCESSING APPARATUS

(71) Applicant: THE UNIVERSITY OF TOKYO, Tokyo (JP)

(72) Inventors: Ryosuke Shibasaki, Tokyo (JP); Dinesh Manandhar, Tokyo (JP); Mamoru Miyawaki, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 336 days.

(21) Appl. No.: 16/483,438

(22) PCT Filed: Feb. 7, 2018

(86) PCT No.: PCT/JP2018/004166
§ 371 (c)(1),
(2) Date: Aug. 5, 2019

(87) PCT Pub. No.: WO2018/147314
PCT Pub. Date: Aug. 16, 2018

(65) Prior Publication Data
US 2019/0353797 A1     Nov. 21, 2019

(30) Foreign Application Priority Data
Feb. 9, 2017 (JP) .............................. JP2017-022536

(51) Int. Cl.
*G01S 19/21* (2010.01)
*G01S 19/38* (2010.01)
*G01S 19/42* (2010.01)

(52) U.S. Cl.
CPC ............ *G01S 19/215* (2013.01); *G01S 19/38* (2013.01); *G01S 19/21* (2013.01); *G01S 19/42* (2013.01)

(58) Field of Classification Search
CPC .......... G01S 19/00; G01S 19/38; G01S 19/42; G01S 19/21; G01S 19/215
(Continued)

(56) References Cited

U.S. PATENT DOCUMENTS 6,535,163 B1 * 3/2003 Sahai ...................... G01S 19/30
    342/357.63
6,995,689 B2 * 2/2006 Crank ................ B64D 45/0056
    340/970

(Continued)

FOREIGN PATENT DOCUMENTS

EP          1734379 A1    12/2006
JP      2005-157979 A     6/2005

(Continued)

OTHER PUBLICATIONS

Japan Patent Office, Office Action for Japanese Patent Application No. 2020-138840, dated Jun. 8, 2021 (Partial Translation is attached hereto).

(Continued)

*Primary Examiner* — Chuong P Nguyen

(57) ABSTRACT

The present invention sequentially and repeatedly accepts a plurality of types of information that can change with time, including position information obtained using a satellite signal, and correlates and records the accepted plurality of types of information with time information.

4 Claims, 7 Drawing Sheets

(58) Field of Classification Search
USPC .............. 342/357.59, 357.2, 357.21, 357.25
See application file for complete search history.

(56) References Cited

U.S. PATENT DOCUMENTS

| | | | |
|---|---|---|---|
| 7,158,053 B2* | 1/2007 | Crank | G08G 5/0082 340/963 |
| 7,436,322 B2* | 10/2008 | Crank | B64D 45/0031 701/14 |
| 8,032,276 B2* | 10/2011 | Cawse | G01C 21/26 701/32.4 |
| 8,279,116 B2* | 10/2012 | Duffett-Smith | G01S 19/30 342/357.77 |
| 8,792,905 B1 | 7/2014 | Li et al. | |
| 8,948,392 B2 | 2/2015 | Chassagne | |
| 2002/0193121 A1 | 12/2002 | Nowak et al. | |
| 2003/0130771 A1* | 7/2003 | Crank | G08G 5/0086 701/4 |
| 2006/0119507 A1 | 6/2006 | Cawse | |
| 2007/0049289 A1 | 3/2007 | Woo | |
| 2007/0214202 A1* | 9/2007 | Beylkin | G01V 1/28 708/290 |
| 2008/0068260 A1 | 3/2008 | Shipper | |
| 2008/0076450 A1 | 3/2008 | Nanda et al. | |
| 2011/0063166 A1 | 3/2011 | Guo | |
| 2011/0169690 A1* | 7/2011 | Yule | G03B 17/24 342/357.25 |
| 2013/0132548 A1* | 5/2013 | Cabos | H04N 21/63 709/223 |
| 2013/0210452 A1 | 8/2013 | Sung | |
| 2013/0251150 A1 | 9/2013 | Chassagne | |

FOREIGN PATENT DOCUMENTS

| | | |
|---|---|---|
| JP | 2010-505370 A | 2/2010 |
| JP | 2013-130395 A | 7/2013 |
| JP | 2013-534622 A | 9/2013 |
| JP | 5400529 B2 | 1/2014 |
| JP | 5667967 B2 | 2/2015 |
| TW | 201218714 A | 5/2012 |
| TW | 201333513 A1 | 8/2013 |
| WO | 2008/039872 A2 | 4/2008 |

OTHER PUBLICATIONS

WIPO, International Search Report for PCT/JP2018/004166, dated May 15, 2018.
WIPO, Written Opinioin for PCT/JP2018/004166, dated May 15, 2018.
Taiwan Patent Office, Office Action for TW Application No. 107104486, dated May 19, 2020 (partiail translation thereof).
Japan Patent Office, Office Action for Japanese Patent Application No. 2018-567458, dated Apr. 21, 2020.
Australian Government IP Australia, Office Action for Australian Patent Application No. 2018218371, dated May 19, 2020.
Korean Patent Offie, First Office Action for Korean Patent Application No. 2019-7023437, dated Apr. 13, 2021 (Partial Translation is attached hereto).
European Patent Office, Extended European Search Report for European Patent Application No. 18751261.1, dated Mar. 21, 2021.
Taiwanese Patent Office, Taiwanese Office Action for Taiwanese Patent Application No. 109140756, dated Aug. 12, 2021 (A partial translation of the Taiwanese Office Action is attached hereto).
Australian Government IP Australia, Examination Report No. 1 for standard patent application, dated Jun. 6, 2022.
State Intellectual Property Office of the People's Republic of China, Chinese Office Action, dated Sep. 27, 2022.

* cited by examiner

POSITION INFORMATION PROCESSING SYSTEM AND POSITION INFORMATION PROCESSING APPARATUS

TECHNICAL FIELD

The present invention relates to a position information processing system using a satellite signal, and a position information processing apparatus.

BACKGROUND ART

In recent years, a positioning technology that acquires position information using signals transmitted from a GPS (Global Positioning System) satellite has been widely utilized. In addition, the positioning technology may be utilized for relieving traffic congestion in an urban area by using the positioning technology for charging users of vehicles moving in the urban area, and the like.

On the other hand, while position information is utilized in more scenes, it is concerned that a fraud is committed by tampering the position information. Therefore, Patent Literatures 1 and 2 disclose a technology of using a quasi-zenith satellite (QZSS) together with a GPS satellite and preventing tampering of position information obtained by using signals transmitted by the satellites.

CITATION LIST

Patent Literature

Patent Literature 1: Japanese Patent No. 5400529
Patent Literature 2: Japanese Patent No. 5667967

SUMMARY OF INVENTION

Technical Problem

In aspects of application of position information, for example, there is a case that the position information needs to be continuously recorded over a fixed period of time such as the case of recording a locus of movement of a moving body over a predetermined period of time. In a scene of such application, it is generally needed to record information acquired separately from the position information (information authenticating a driver of the moving body, for example) together with the position information. In the case of continuously recording such information, it is concerned that an information amount generally becomes huge and a usable storage capacity of a storage apparatus is decreased.

In the meantime, in recent years, technology of transmitting a spoofed GPS satellite signal and tampering records of position information has been developed.

One aspect of the present invention is implemented in consideration of the actual circumstances, and one of objects of the aspect is to provide a position information processing system and a position information processing apparatus capable of efficiently recording position information.

In addition, one of the objects of another aspect of the present invention is to provide a position information processing system and a position information processing apparatus capable of preventing the position information from being tampered even when a spoofed GPS satellite signal is used.

Solution to Problem

One aspect of the present invention that solves problems of conventional examples described above includes a position information processing apparatus. The position information processing apparatus includes: a accepting device that sequentially and repeatedly accepts a plurality of types of information changeable with time, including position information obtained using a satellite signal; and a recording device that correlates and records the accepted plurality of types of information together with time information, and the recording device selects information to be a basis of prediction from the repeatedly accepted information, and selectively records the information to be the basis of the prediction and information determined as being unpredictable from the information to be the basis of the prediction by a predetermined method.

In addition, one aspect of the present invention that solves problems of conventional examples described above includes a position information processing apparatus. The position information processing apparatus includes: a accepting device that sequentially and repeatedly accepts a plurality of types of information changeable with time, including position information obtained using a satellite signal; and a recording device that correlates and records the accepted plurality of types of information together with time information, the accepting device records information relating to the satellite signal which is a basis of an calculation of the position information and provides the information for authentication processing and, when two or more pieces of the position information relating to mutually different positions are obtained, the recording device records the obtained position information indicating the mutually different positions.

Advantageous Effects of Invention

According to one aspect of the present invention, position information can be efficiently recorded.

In addition, according to another aspect of the present invention, tampering of the position information can be prevented.

DESCRIPTION OF EMBODIMENT

Figure 1:
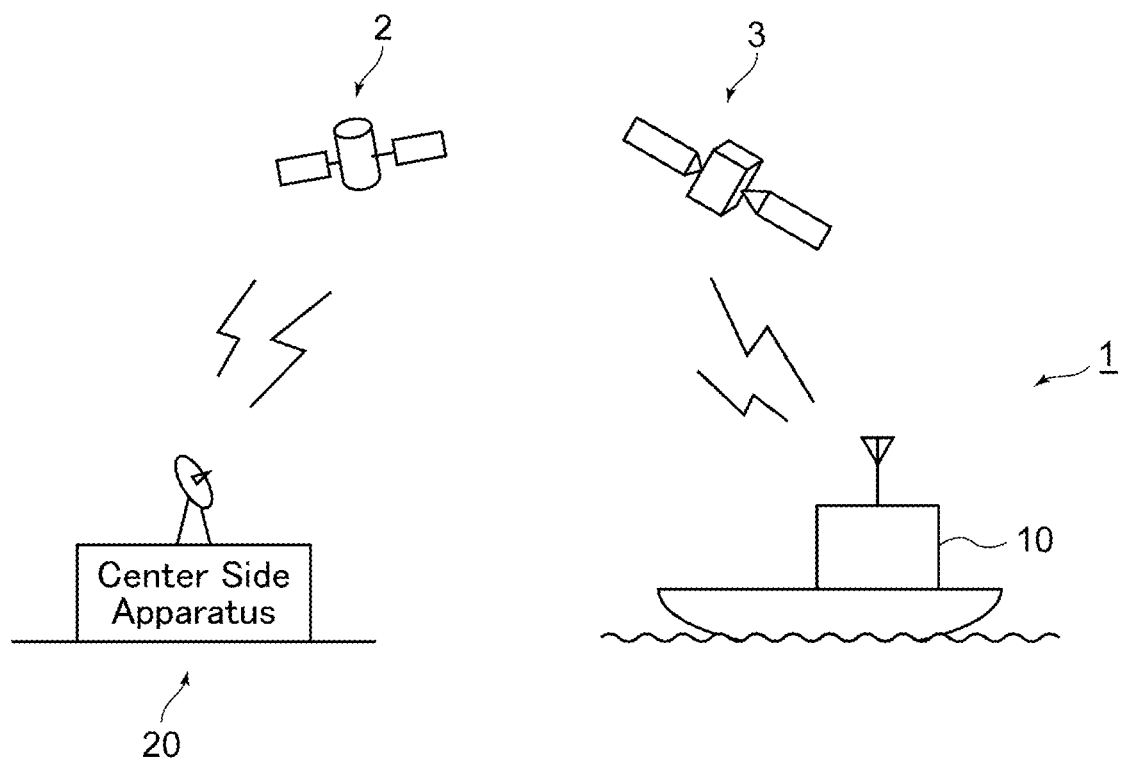
FIG. 1 is a schematic configuration diagram showing an example of a position information processing system according to an embodiment of the present invention.

An embodiment of the present invention will be described with reference to drawings. A position information processing system 1 according to the embodiment of the present invention receives signals (such as a navigation message) from a GPS satellite 2 and a quasi-zenith satellite (QZSS) 3, and obtains position information based on the signals, as illustrated in FIG. 1. In addition, the position information processing system 1 according to an example of the present embodiment is configured including a position information processing apparatus 10 arranged on a moving body, and a center side apparatus 20 generally arranged at a position away from the moving body.

While the GPS satellite 2 and the quasi-zenith satellite 3 are examples here, the present embodiment is not limited thereto, signals of a global navigation satellite system other than GPS, that is, GLONASS, Gallileo, BeiDou or the like may be used, and signals of Satellite Based Augmentation System (SBAS) other than the quasi-zenith satellite (QZSS), that is, EGNOS of Europe, WAAS of the US, GAGAN of India, SDCM of Russia, or MSAS of Japan may be used.

In the example of the present embodiment, the center side apparatus 20 may uplink predetermined encrypted information (encryption code) that changes according to time to the quasi-zenith satellite 3, and make the quasi-zenith satellite 3 send out the encryption information together with the navigation message or the like. Since the operation is the same as the operation disclosed in Japanese Patent No. 5667967 (Patent Literature 2), detailed description thereof is omitted here.

Figure 2:
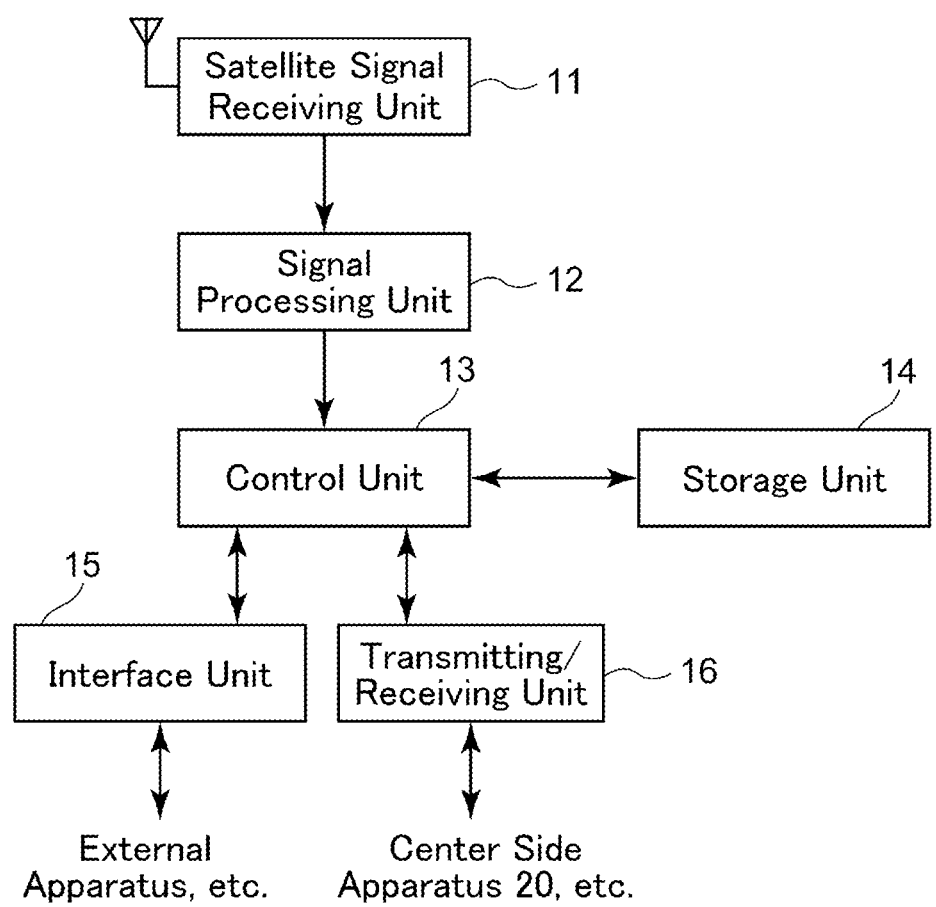
FIG. 2 is a configuration block diagram showing an example of position information processing according to an embodiment of the present invention.

In addition, as illustrated in FIG. 2, the position information processing apparatus 10 is configured including a satellite signal receiving unit 11, a signal processing unit 12, a control unit 13, a storage unit 14, an interface unit 15, and a transmitting/receiving unit 16.

The satellite signal receiving unit 11 receives signals sent out by the GPS satellite 2 and the quasi-zenith satellite (QZSS) 3, and outputs the received signals to the signal processing unit 12. The signal processing unit 12 converts the signals (RF signals) received by the satellite signal receiving unit 11 to intermediate frequency signals (IF signals), amplifies the signals in a variable gain amplifier or the like using AGC (Auto Gain Control), further converts the signals to digital signals by A/D conversion, and outputs the signals to the control unit 13. In addition, when (1) a spoofed-signal transmitter (so-called spoofer) transmits spoofed signals imitating the signals sent out by the GPS satellite 2,
(2) signals interfering with the signals sent out by the GPS satellite 2 are transmitted, or
(3) jamming signals are transmitted, or the like, the signal processing unit 12 outputs the (digitized) IF signals including the spoofed signals or the like to the control unit 13.

The control unit 13 is a program controlled CPU or DSP (Digital Signal Processor) or the like, and repeatedly calculates position information based on the input signals at each predetermined timing. Since the calculation processing is widely known, the detailed description is omitted here.

The control unit 13 operates according to a program stored in the storage unit 14, and executes acquisition processing of accompanying information, recording processing of the position information and the accompanying information, and detection processing of the spoofed signals or the like. Details of the individual processing will be described later. The storage unit 14 is a semiconductor recording element or the like, and records information such as the position information and the accompanying information according to an instruction input from the control unit 13. In addition, the storage unit 14 is configured including a memory element, and holds the program to be executed by the control unit 13. Further, the storage unit 14 also operates as a work memory of the control unit 13.

The interface unit 15 is connected to various types of apparatuses that collect the accompanying information, and outputs the information output by the various types of apparatuses to the control unit 13. Here, examples of the apparatuses that collect the accompanying information include an authentication apparatus that authenticates a user, a measuring instrument that measures weight of a moving body (such as a vehicle, a ship or a carrier), an imaging apparatus that outputs captured image information, and so forth.

In one example of the present embodiment, the apparatus that collects the accompanying information includes a biometric sensor for identifying a user. The apparatus converts biological data detected by the biometric sensor to digital information, and outputs the information to the control unit 13. The biometric sensor may be of any type such as face authentication, fingerprint authentication, vein authentication or iris authentication. In addition, as a method of identifying a driver driving a car or a captain of a ship, a camera that tracks the face of the driver may be installed at a driver's seat, a fingerprint sensor or a vein sensor may be provided on a handle or a tiller, pieces of information sequentially output by the camera and the sensor may be temporally synchronized and correlated, and the correlated pieces of the information may be output to the control unit 13. In such a manner, more highly reliable user authentication can be performed.

In addition, the apparatus that collects the accompanying information may collect detection information of a predetermined object other than the user as the accompanying information, and output the information to the control unit 13. Examples of the object here include not only the moving bodies such as a vehicle or a ship used by the user but also things received or delivered by the user using the moving bodies. For example, in the case of a fishing boat, fish, etc., caught by fishing by the captain who is the user are also included in the examples of the object. In the case of the fishing boat, the kind of the caught fish is specified by a camera, and weight or a volume occupancy of the caught fish in a storage space is measured for determining a volume of fish catches, these types of information being correlated and used as accompanying information.

The transmitting/receiving unit 16 is, for example, a radio communication apparatus, and communicates with the center side apparatus 20 according to an instruction input from the control unit 13. The transmitting/receiving unit 16 sends out the information to the center side apparatus 20 according to the instruction input from the control unit 13. In addition, the transmitting/receiving unit receives the signals sent out by the center side apparatus 20 to the position information processing apparatus 10, decodes and acquires the information included in the signals, and outputs the information to the control unit 13. Further, the transmitting/receiving unit 16 may communicate with the center side apparatus 20 by wired connection.

Figure 3A:
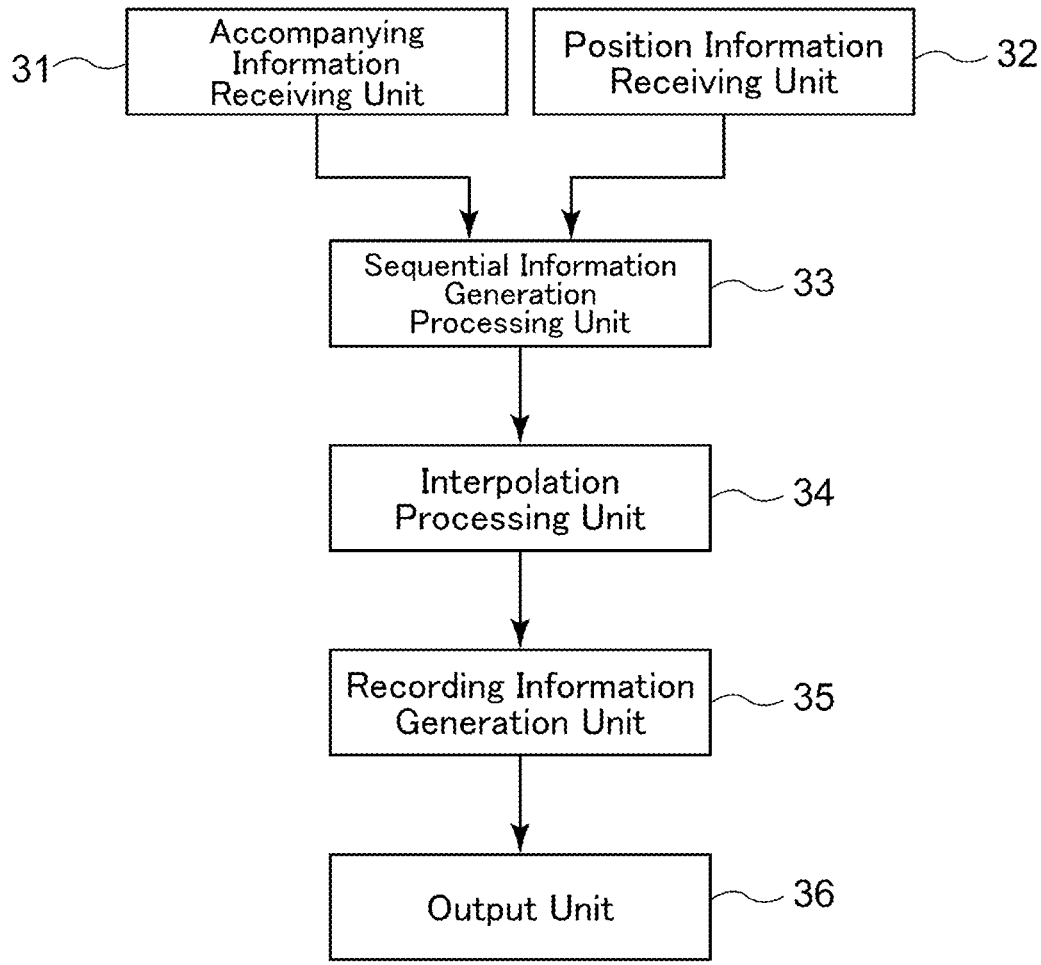
FIG. 3A is a functional block diagrams showing examples of the position information processing according to an embodiment of the present invention.

Next, an operation of the control unit 13 will be described. In the present embodiment, as illustrated in FIG. 3A, the control unit 13 is configured functionally including an accompanying information accepting unit 31, a position information accepting unit 32, a sequential information generation processing unit 33, an interpolation processing unit 34, a recording information generation unit 35, and an output unit 36. The control unit 13 and the storage unit 14 may be configured by one chip or may be configured including a plurality of ICs or the like.

Here, the accompanying information accepting unit 31 outputs the accompanying information input from the apparatus (or each of the apparatuses, when there are a plurality of apparatuses) that collects the accompanying information through the interface unit 15 to the sequential information generation processing unit 33. The position information accepting unit 32 generates the position information by a widely known method, based on the signals accepted from the signal processing unit 12. Here, there may be a plurality of types of the accompanying information such as user authentication information and load information.

The sequential information generation processing unit 33 generates sequential information including the accompanying information accepted by the accompanying information accepting unit 31 and the position information accepted by the position information accepting unit 32. Specifically, the sequential information generation processing unit 33 issues time information repeatedly at each predetermined timing. Here, it is defined that the time information is periodically and repeatedly issued at every $\Delta t$ seconds. Then, the sequential information generation processing unit 33 generates and outputs the sequential information which is generated by correlating the issued time information with the plurality of types of information such as the accompanying information and the position information accepted immediately before the timing at which the time information is issued.

The sequential information Ri is output by the sequential information generation processing unit 33 in the past, and the interpolation processing unit 34 holds the sequential information Ri (i=1, 2, . . . ; Ri being the sequential information output at the time point after $\Delta t \cdot i$ has passed from the time of the initial output) corresponding to only the last N times of output (N is an integer equal to or larger than 2, and is experimentally and appropriately determined), so that the interpolation processing unit 34 holds the sequential information Rj to Rj+N. The interpolation processing unit 34 uses, in a predetermined interpolation function (a spline function, for instance), the values of the position information and the accompanying information included in the latest sequential information (Rj) among the sequential information corresponding to the last N times of outputs and the values of the relevant position information and accompanying information included in the sequential information Rj+N (output $\Delta t \cdot N$ after the output of the Rj), and predicts values of the relevant position information and accompanying information included the sequential information Rj+1, Rj+2 . . . Rj+N−1. Then, the interpolation processing unit 34 compares the predicted values with actually input values.

For example, provided that Qj(t) represents each piece of the position information or the accompanying information included in the sequential information Rj (j=1, 2, . . . )), the interpolation processing unit 34 predicts the information Qj+1, Qj+2 . . . Qj+N−1 at the time points respectively included in the sequential information Rj+1, Rj+2 . . . Rj+N−1 among the sequential information corresponding to the last N times of outputs, using the interpolation function. Then, the values Q'j+1, Q'j+2, . . . Q'j+N−1 obtained by the prediction and the values Qj+1, Qj+2 . . . Qj+N−1 representing the relevant types of the information at the corresponding points of time are compared (the difference is calculated, for example). The interpolation processing unit 34 performs the processing for the each type of information Q included in the sequential information R. Note that, as an interpolation function, different functions may be used for different types of information.

As a result of the comparison here, the interpolation processing unit 34 determines whether or not the predicted value is within a predetermined error range from the value output by the sequential information generation processing unit 33, with respect to each piece of the held sequential information corresponding to the last N times of outputs, and records the determination result for each piece of the held sequential information.

The recording information generation unit 35 refers to the determination results recorded by the interpolation processing unit 34, in the order from the result corresponding to the oldest piece of the sequential information held by the interpolation processing unit 34. When a predicted value of any of the information included in the sequential information at a point of time is determined as being out of the error range from the value output from the sequential information generation processing unit 33, the recording information generation unit 35 outputs the sequential information Rj and Rj+N used in an interpolation operation and the sequential information Rj+n (n is an integer to be 1<n<N−1) including the information at the point of time at which the predicted value is determined as being out of the error range from the value output from the sequential information generation processing unit 33 to the output unit 36 as recording targets.

Then, the recording information generation unit 35 deletes the held sequential information Rj, Rj+1, . . . Rj+N−1, and Rj+N, stands by until the sequential information R is newly held for N times, and makes the interpolation processing unit 34 perform the processing of generating the determination result. In this way, in the present embodiment, by selectively recording the information to be a basis of the prediction and the information determined as being unpredictable by a predetermined method from the information to be the basis of the prediction, an amount of the information to be recorded is reduced.

In addition, in the case where the sequential information including the information at the point of time at which the predicted value of the information is determined as being out of the error range from the value output from the sequential information generation processing unit 33, is not found, that is, in the case where the respective types of information included in the sequential information Rj+1, . . . , Rj+N−1 output between the sequential information Rj held first and the sequential information Rj+N held last, can be predicted within the error range predetermined by the predetermined interpolation function from the sequential information Rj and the sequential information Rj+N, the recording information generation unit 35 outputs the sequential information Rj held first and the sequential information Rj+N held last to the output unit 36 as the recording targets. Then, the recording information generation unit 35 deletes the held sequential information Rj, Rj+1, . . . , Rj+N−1, and Rj+N, stands by until the sequential information R is newly held for N times, and makes the interpolation processing unit 34 perform the processing of generating the determination result. The output unit 36 accumulates the sequential information output by the recording information generation unit 35 in the storage unit 14 to be stored.

Further, for the sequential information not to be recorded (for example, the sequential information including only the information determined as being predictable by the interpolation operation based on the preceding and subsequent pieces of the sequential information), instead of the sequential information, the recording information generation unit 35 may output the information including prediction method specifying information that specifies a prediction method (for example, information that specifies the interpolation function used in the prediction or information that specifies the sequential information used in the prediction) in correlation with the time information indicating the point of time to record the sequential information, instead of the sequential information.

That is, in the example, for the sequential information that is the basis of the prediction and the sequential information determined as being unpredictable by the predetermined method from the sequential information to be the basis of the prediction, the recording information generation unit 35 outputs the sequential information itself (conveniently referred to as real information) in correlation with the time information indicating the point of time at which the sequential information is input. In addition, for the time information indicating the point of time at which the sequential information determined as being predictable by the predetermined method from the sequential information to be the basis of the prediction is input, the recording information generation unit 35 correlates the prediction method specifying information for predicting the sequential information, and outputs the correlated information. That is, the information output by the recording information generation unit 35 here is combined information for which the real information and the prediction method specifying information are combined.

According to the example above of the present embodiment, for sequentially obtained actual information (for example, the real information such as actual position data or the accompanying information like user authentication information), the position information processing apparatus 10 performs an operation (for example, an operation of fitting a locus by a spline function) of predicting the information obtained in a certain time duration by interpolation from a real information group buffered in the certain time duration. Then, the position information processing apparatus 10 compares the real information with the predicted information obtained by the interpolation, and determines whether or not a difference between the predicted information and the real information is within a predetermined range.

In the case where the predicted information is within the predetermined range from the real information, the position information processing apparatus 10 records the prediction method specifying information that specifies the prediction method (such as the information that specifies the interpolation function) without recording the real information in the time duration. In the case where the interpolation function is predetermined, since it is not needed to record the information that specifies the interpolation function, the position information processing apparatus 10 may not record the prediction method specifying information. In this case, at the point of time at which the prediction is possible, no information may be recorded, or only the time information with which no other information (the information that can be predicted) is correlated may be recorded. In addition, in the case where the predicted information is not within the predetermined range from the real information, the position information processing apparatus 10 records the real information.

Figure 4:
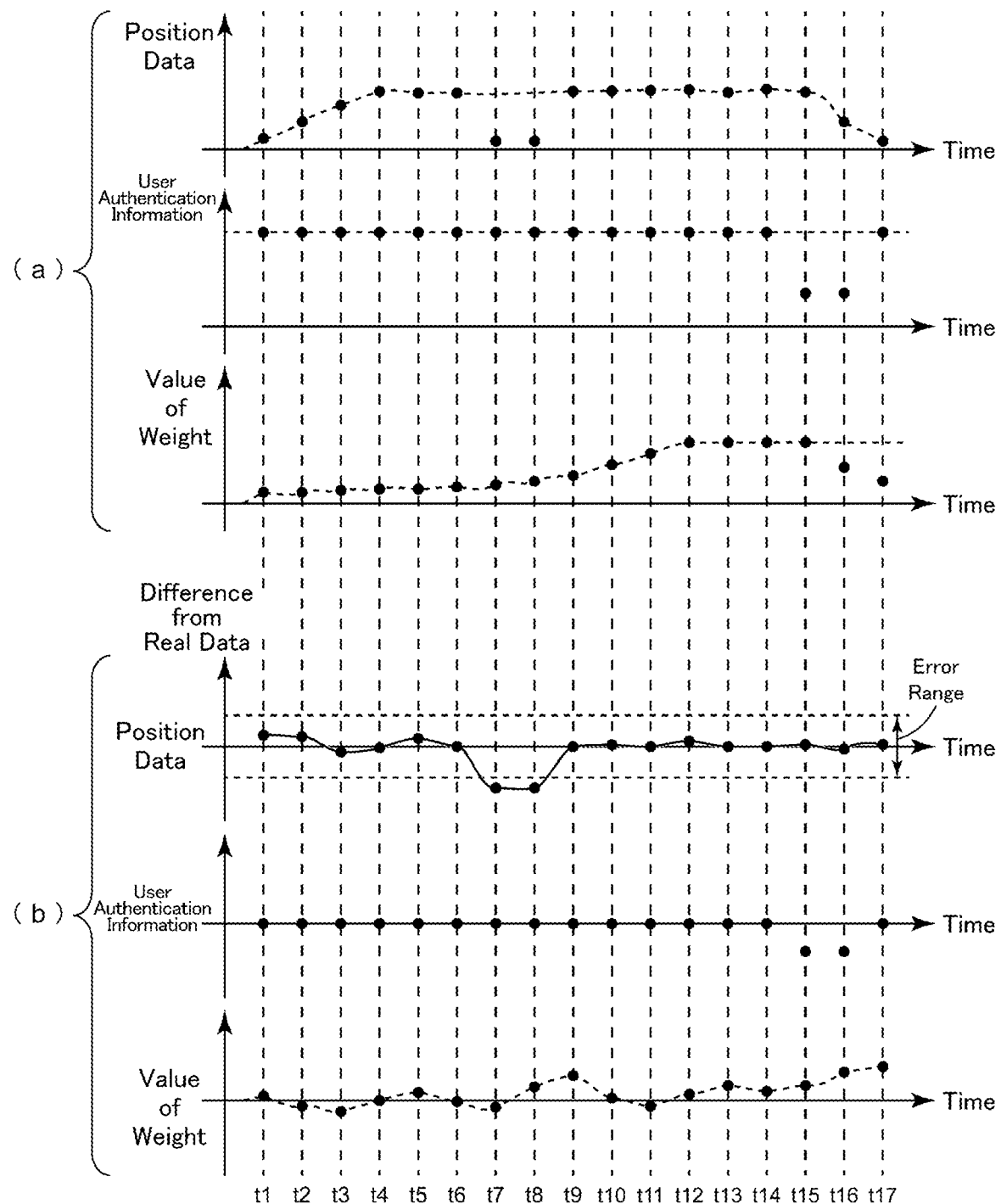
FIG. 4 is an explanatory diagrams showing examples of information recording processing by the position information processing according to an embodiment of the present invention.

The operation of the position information processing apparatus 10 of the present embodiment will be described with reference to FIG. 4. FIG. 4 show examples of the sequential information output by the sequential information generation processing unit 33 from time t1 to time t17. FIG. 4 show the example in which three types of time-sequential information that are position data, user authentication information and load weight information are the recording targets.

In FIG. 4, a vertical axis indicates values of the individual information (a). Note that, while the individual information has a one-dimensional value in order to simplify illustration and description, the actual information may be vector information or the like. In addition, in FIG. 4, the values actually obtained by satellite signals or measurement are indicated by discrete points (a).

The position information processing apparatus 10 approximates each of the individual types of the information by a predetermined interpolation function (the interpolation function may be different for each type of the information). To be concrete, approximation by a spline function is performed for the position data and the load weight information, and 0-order approximation (approximation assuming that the information does not change) is performed for the user authentication information. Results of the approximation are each indicated by a broken curve (or a broken straight line) in (a) in FIG. 4.

FIG. 4 also shows a difference between the actual value of the corresponding type of the information at the corresponding point of time and the result of the approximation (the difference refers to a matching degree of the approximate value with the actual measurement value (b), therefore may be not only the difference but also a difference of ratio from "1", a magnitude of a distance between vectors, or the like) from.

As illustrated in FIG. 4, while the position data sequentially changes accompanying the movement of the moving body, the sequentially changing moving route is approximated by a predetermined interpolation function, and the information at the points of time at which a correlation value (it is the difference here) of a comparison result between the predicted information obtained from the interpolation function and the real information exceeds a predetermined threshold (correlation is low) (the information at the points of the time t7 and the time t8 in FIG. 4) is defined as the recording target.

In addition, the same processing is performed also for the user authentication information and the load weight information, and the information at the points of time at which the correlation value between the user authentication information and the predicted information at the corresponding time obtained from the interpolation function is lower than the predetermined correlation value (the difference is large) (for example the information at t15 and t16 in FIG. 4) is defined as the recording target. In such a manner, by determining the information at the point of time at which at least one of the three types of the information determined as the recording targets cannot be predicted from the preceding and subsequent pieces of the information, as the recording target, and by recording only the information selected as the recording target by the method in addition to the information required as the basis of the prediction, the amount of the information to be recorded is reduced.

Note that, at the point of time at which the fishing boat sails out from a fishing port, acceleration often changes greatly and cannot be reproduced by a simple approximation curve. Therefore, not the information (such as the prediction method specifying information) relating to predicted interpolation data but actual data (real information) is recorded. Thus, the locus at the time of sailing out is relatively accurately recorded. In addition, since a movement locus changes relatively straight until the fishing boat comes close to a fishing spot, the interpolation becomes effective, and the information relating to the interpolation data is recorded. Thus, the amount of data to be recorded can be reduced.

Further, near the fishing spot, the movement of the fishing boat becomes complicated so as to move to the position of a school of fish, the interpolation cannot be performed, and the real information is recorded. When fishing is started, even in a state where the position does not change, since a load amount changes, the interpolation cannot be performed, and the real information is recorded. Thereafter, a relatively simple route is taken until the fishing boat returns to the fishing port after the fishing ends so that the correlation value between the interpolation data and the real information becomes high, and the information relating to the interpolation data is recorded. When the fishing boat returns to the fishing port, the user authentication information and weight of the load largely change during unloading, and the real information is recorded.

The sequential information recorded in such a manner is sent out to the center side apparatus 20 or a predetermined apparatus (the apparatus authenticated beforehand) by an instruction from the user or under a predetermined condition (the condition that communication with the center side apparatus 20 becomes possible, or the like) later. Then, in the apparatus that accepts the sequential information, at the point of time at which the real information is recorded, the individual types of the information included in the real information is reproduced on the basis of the real information.

On the other hand, at the point of time at which the information according to the interpolation data is recorded (a part where it is recorded that the real information is absent), the predicted value is generated on the basis of the real information recorded immediately before and immediately after the information according to the interpolation data (or the real information specified as the information to be the basis of the prediction by the information according to the interpolation data) and the predetermined interpolation function (or the interpolation function specified by the information recorded as the information according to the interpolation data), and the accompanying information such as the user authentication information and the load weight information correlated to a history of the position information and the individual position information at the individual point of time is reproduced.

Then, by the information reproduced on the basis of the real information or the information according to the interpolation data, records relating to the moving body can be obtained, and for example, it can be authenticated for the fishing boat that fishing is performed at a determined fishing spot, and it can be authenticated for a vehicle that traveling is performed by a determined driver in a determined area, or the like

[Detection of Spoofed Signal]

Figure 3B:
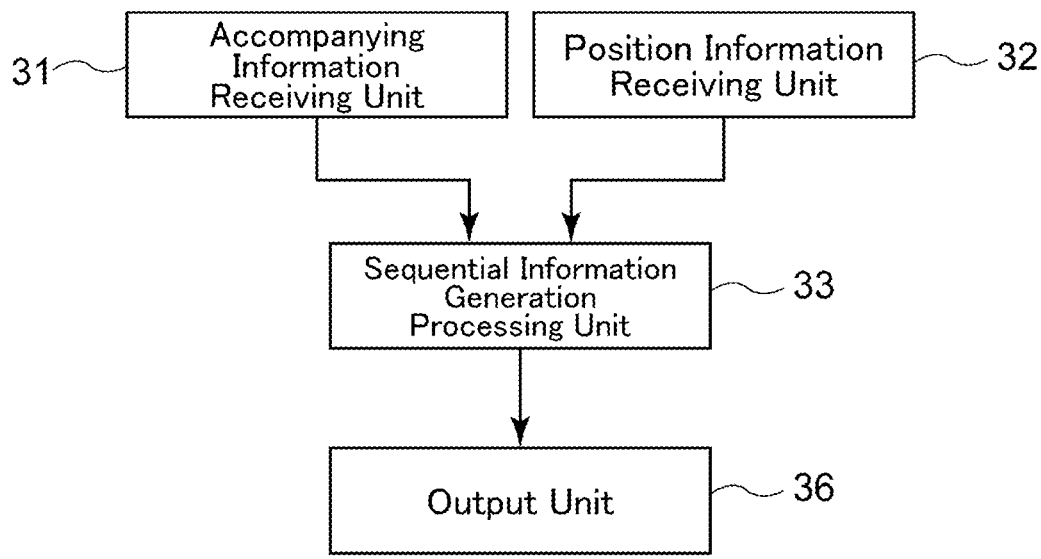
FIG. 3B is a functional block diagrams showing examples of the position information processing according to an embodiment of the present invention.

In addition, in the present embodiment, since the control unit 13 may detect a spoofed signal pretending to be the signal from the satellite, the processing therefor will be described below. In the present embodiment, the control unit 13 executes the following processing. Note that the control unit 13 here may not functionally include the interpolation processing unit 34 and the recording information generation unit 35 as illustrated in FIG. 3B. That is, the control unit 13 in this case may not necessarily perform the processing of the interpolation processing unit 34 and the recording information generation unit 35, and in the case of not performing the operations (in the case of functionally including a configuration illustrated in FIG. 3B), the control unit 13 accumulates and stores the information (real information) sequentially output by the sequential information generation processing unit 33 in the storage unit 14.

The control unit 13 that detects the spoofed signal in the present embodiment accepts the intermediate frequency signals (IF signals) which are the signals converted from the signals received by the satellite signal receiving unit 11 (RF signals).

Figure 5:
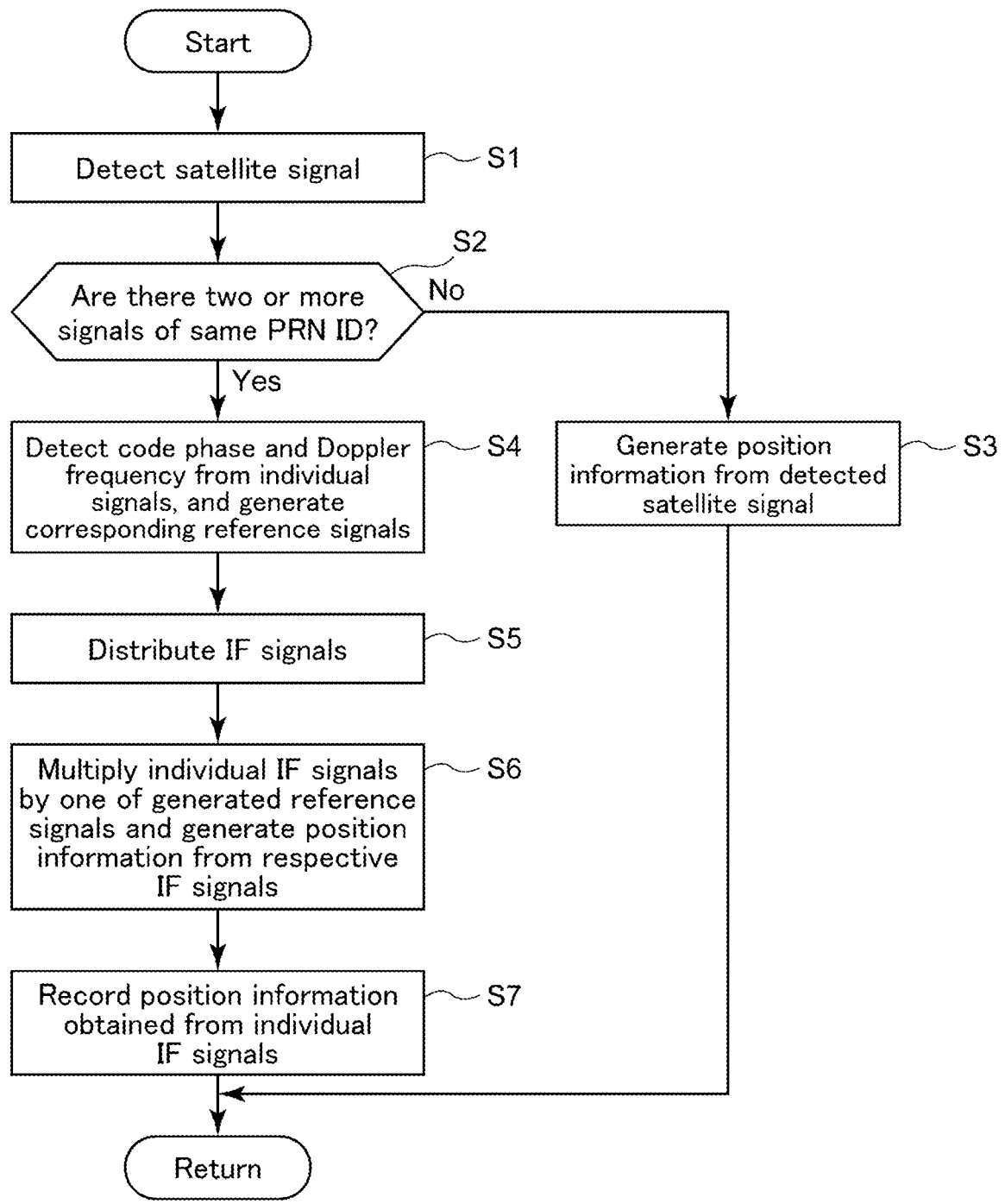
FIG. 5 is a flowchart diagram showing a detection processing example of a spoofed signal by the position information processing according to an embodiment of the present invention.

Then, as illustrated in FIG. 5, the control unit 13 performs the processing of coherent integration of performing an FFT operation with the IF signals (the signals after being digitized) and replica signals for 10 milliseconds, and executes satellite signal detection processing (S1). The replica signals are pseudo signals generated by the control unit 13, which are the signals imitating C/A (Coarse/Acquisition) signals, i.e., a kind of PRN (Pseudo Random Noise) included in the signals of the GPS satellite 2 to be captured. The operation is the same as the satellite signal detection processing widely performed at present so that the detailed description is omitted here.

Figure 6A:
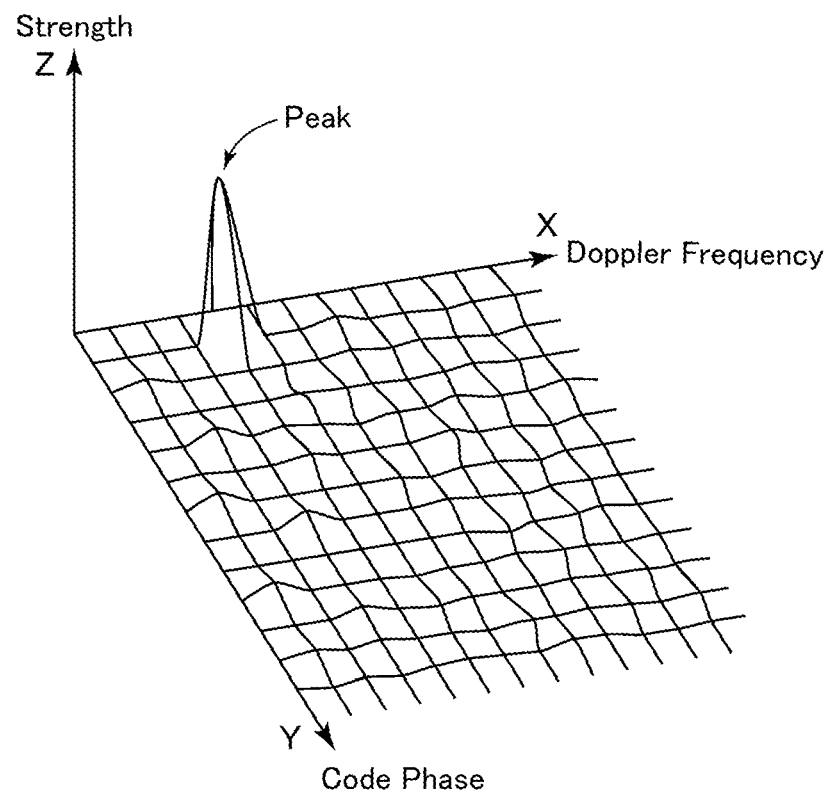
FIG. 6A is an explanatory diagrams showing a detection processing example based on signals including the spoofed signal processed by the position information processing according to an embodiment of the present invention.

The control unit 13 checks whether or not a plurality of peaks exist in the signals obtained as the result of the FFT operation (to be a matrix of the correlation values) (whether or not there is a set of a code phase and a Doppler frequency, exceeding a predetermined threshold). FIG. 6 illustrate the matrix of the correlation values, an axis in a height direction (Z) indicates strength (power), a depth direction (Y) indicates the code phase, and a width direction (X) indicates the Doppler frequency.

Generally, in capture of the GPS satellite 2 or the like, the highest peak is to be detected from the matrix of the correlation values. In the case where the spoofer does not exist, there is one peak (one satellite signal) (FIG. 6A), and thus, the code phase and a carrier frequency can be estimated.

Figure 6B:
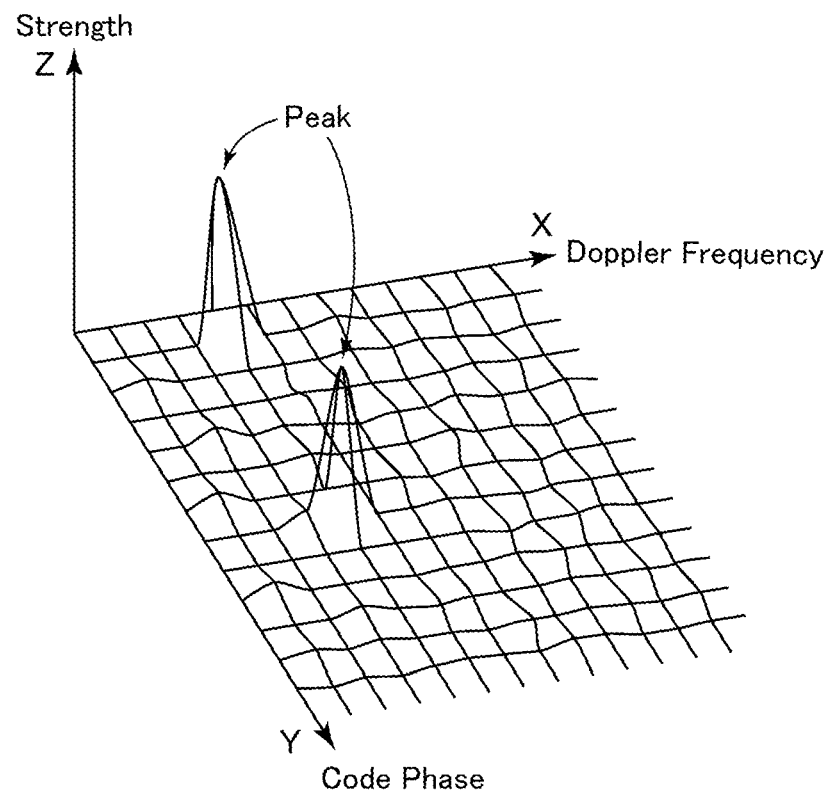
FIG. 6B is an explanatory diagrams showing a detection processing example based on signals including the spoofed signal processed by the position information processing according to an embodiment of the present invention.

However, in the case where the spoofer exists, a plurality of peaks appear within the correlation value matrix (a plurality of satellite signals are detected) corresponding to one PRN ID (information that identifies a satellite) (FIG. 6B). One of characteristic features in the present embodiment is that the control unit 13 not only detects the code phase and the carrier frequency corresponding to the highest peak, but also detects the plurality of pieces of information when there are two or more pieces of the information of the sets of the code phase and the Doppler frequency with the power exceeding the predetermined threshold (at the peak).

For the purpose, in the example of the present embodiment, the control unit 13 performs signal processing of a plurality of channels in parallel for each PRN ID. The control unit 13 checks whether or not a plurality of satellite signals are detected in the processing S1 (S2). When a single signal is detected here (processing S2: No), the position information is obtained from the one satellite signal, and the position information is output as the recording target (S3).

The case where there is one satellite signal, as above, may be
(1) a case where a correct satellite signal is received, or
(2) a case where an antenna wire is pulled out and the signal of the spoofer is directly supplied to an antenna.

Then, in one example of the present embodiment, it is suitable that the position information processing apparatus 10 is a tamper-resistant apparatus so as not to function when the antenna wire is pulled out. For such a purpose, in one example of the present embodiment, a detection line (signal wire or the like) that detects whether or not pulling out is performed may be arranged in parallel with the antenna wire, and when the detection line is cut off, the position information processing apparatus 10 may determine that a failure occurs and perform the operation of issuing an alarm.

Returning to the description of FIG. 5, when the plurality of signals are detected in the processing S2 (processing S2: Yes), the control unit 13 uses the two or more pieces of the detected information of the sets of the code phase and the Doppler frequency, and generates, as spreading codes, reference signals (so-called C/A reference signals) using the respectively corresponding code phases on the basis of the code phases and the Doppler frequencies included in the individual sets. The control unit 13 also outputs the information of the corresponding carrier frequencies (S4).

The control unit 13 distributes (duplicates) the input IF signals (the signals after being digitized) for the number of the peaks detected in the processing S2 (or the smaller number from among the number of the peaks detected and an upper limit value of the number of processable channels), and sets the signals into the signals of the channels respectively different from each other (S5). The control unit 13 multiplies the signals of each channel by the plurality of reference signals and the corresponding carrier frequencies obtained in the processing S4, outputs the signals through a low-pass filter, and takes out a corresponding navigation message for each of the plurality of reference signals (and carrier frequencies) obtained in the processing S4 (S6).

The control unit 13 records the position information (including the position information based on the satellite signal of the GPS satellite 2 or the like, and the position information based on the spoofed signal of the spoofer) from each of the plurality of navigation messages taken out here, in correlation with the common time information and the accompanying information supplied from other apparatuses in the processing as the sequential information generation processing unit 33 (S7). The control unit 13 repeatedly executes the processing illustrated in FIG. 5 until recording end of the position information and the accompanying information is instructed.

In addition, the control unit 13 repeatedly checks whether or not the communication with the center side apparatus 20 becomes possible. Then, when the communication with the center side apparatus 20 becomes possible, using the method disclosed in Japanese Patent No. 5400529 (Patent Literature 1) for example, authentication processing of each piece of the recorded position information based on the plurality of navigation messages (including the position information based on the satellite signal of the GPS satellite 2 or the like and the position information based on the spoofed signal of the spoofer) is executed. Then, the authenticated position information is defined as true position information (the position information based on the satellite signal of the GPS satellite 2 or the like), other correlated position information (the position information based on the spoofed signal of the spoofer) is eliminated, and the sequential information after the elimination is output to outside.

[Incoherent Synthesis]

In addition, the control unit 13 may execute the processing S1 and the processing thereafter in FIG. 5 after further performing incoherent synthesis of adding and synthesizing the signals that are coherent-integrated at different timings with each other and increasing signal strength. In the case of considering possibility of receiving the signal of the spoofer as in the present embodiment, it is assumed that the satellite signal from the GPS satellite 2 or the like is generally feeble compared to the signal of the spoofer so that it is suitable to perform such synthesis processing.

[Another Example of Authentication of Position Information]

In the description so far, the position information is transmitted to the center side apparatus 20 and authenticated, however, the present embodiment is not limited to the example.

In one example of the embodiment of the present invention, the center side apparatus 20 generates a pair of a secret key and a public key for public key encryption beforehand. Then, the center side apparatus 20 obtains a hash value (a hash function is predetermined) of reference authentication navigation data (RAND message) generated by a predetermined method, and encrypts the hash value by the generated secret key. Here, the reference authentication navigation data (RAND message) is disclosed in Japanese Patent No. 5667967 (Patent Literature 2), and the RAND message is the one for which time-of-week bit string data specifying the generation time of the signals and TOC, Af0 and Af1 that are ephemeris data (ephemeris coordinates) are extracted from a bit string of L1C/A signals transmitted from the GPS satellite 2, and AS flag (Anti-Spoof flag) and a PRN (Pseudo Range Noise) ID which is a satellite specifying number are added. Thus, since the RAND message frequently changes with time, the center side apparatus 20 updates and generates the RAND message frequently, calculates the hash value, and generates encrypted information (encryption code).

The center side apparatus 20 uplinks the encrypted information for which the hash value of the RAND message is encrypted, to the QZSS 3. The QZSS 3 sends out the uplinked encrypted information at a predetermined timing. The QZSS 3 may send out the encrypted information using L6 signals for example. The L6 signals are the signals of a transmission speed of 2000 bps, and can sequentially send out the encrypted information that changes with time relatively frequently.

The position information processing apparatus 10 acquires a public key from the center side apparatus 20. The public key is acquired via the Internet, via a wireless LAN system, via a communication satellite, or via the QZSS 3 (the public key is uplinked from the center side apparatus 20 to the QZSS 3 and the QZSS 3 sends out the public key). Note that, since there are two channels of the L6 signals, the same encrypted information may be sent out by the individual channels, or the public key described here may be sent out by one of the channels.

The position information processing apparatus 10 successively selects the signals received from the GPS satellite 2 or the signals output by the spoofer (the signals unclear as to which of them), generates the RAND message by the same method as the center side apparatus 20 using the selected signal, and calculates the hash value (referred to as a comparison hash value) by the same method as the center side apparatus 20. The position information processing apparatus 10 also decrypts the encrypted information received from the QZSS 3 by the public key, and obtains the hash value of the RAND message uplinked from the center side apparatus 20. Then, the position information processing apparatus 10 compares the hash value obtained here with the comparison hash value, and when they coincide, determines that the signal selected as a source of generation of the comparison hash value which coincides with the hash value of the RAND message is the signal transmitted from the GPS satellite 2. In addition, when the obtained hash value and the comparison hash value do not coincide, the position information processing apparatus 10 determines that the signal selected as the source of the generation of the comparison hash value is the signal output by the spoofer.

The position information processing apparatus 10 records the intermediate frequency signals after being digitized (the digitized IF signals) based on each of the signals received from the GPS satellite 2 or the signals output by the spoofer by the plurality of channels in such a manner. In addition, the position information processing apparatus 10 selects the position information generated on the basis of the signal determined as the signal transmitted from the GPS satellite 2 by the above-described method, and records or outputs the information as the most probable information (maximum likelihood information). In this way, real-time determination becomes possible.

Further, the QZSS 3 may send out the encrypted information using L5s signals. Since strength of the L5s signals is high, the signals can be sometimes received even when the position information processing apparatus 10 is in an environment of being indoors or inside a tunnel or the like. Thus, the movement from inside to outside or the like can be also tracked.

Note that the encrypted information is not necessarily transmitted to the position information processing apparatus 10 through the QZSS 3. For example, the encrypted information may be transmitted to the position information processing apparatus 10 through a microsatellite, a small satellite, a reusable manned spacecraft like a shuttle, or a communication satellite or the like, or even without going through outer space, i.e., through any moving body such as an airship, a balloon, a drone, or the like, as long as a apparatus capable of relaying the information by radio can be loaded thereon.

[Sanity Check]

Further, the position information processing apparatus 10 of the present embodiment may perform so-called sanity check of checking whether the received signals are only the signals transmitted from the GPS satellite 2 or include a plurality of signals (that is, presence/absence of the spoofed signals) on the basis of the information of the signal strength.

To be concrete, the position information processing apparatus 10 generates appearance frequency information (histogram) of individual output values of the intermediate frequency signals after being amplified and digitized (the digitized IF signals).

Figure 7A:
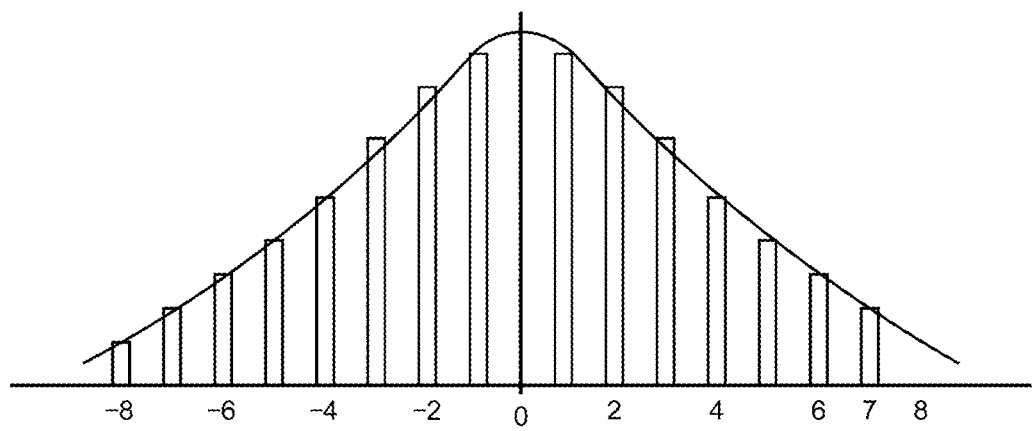
FIG. 7A is an explanatory diagrams showing processing examples of checking presence/absence of the spoofed signal by the position information processing according to an embodiment of the present invention.

In the case where the individual signals received as the signals from the GPS satellite 2 are truly the signals transmitted from the GPS satellite 2, gain of the AGC (Auto Gain Control: not illustrated) used when amplifying the IF signals before being digitized is not saturated so that the histogram is dispersed in a normal distribution shape with a median "0" as a center, as illustrated in FIG. 7A. Note that FIG. 7 illustrate the case where the intermediate frequency signals are expressed as 4-bit digital signals and the value can be from −8 to +7.

Figure 7B:
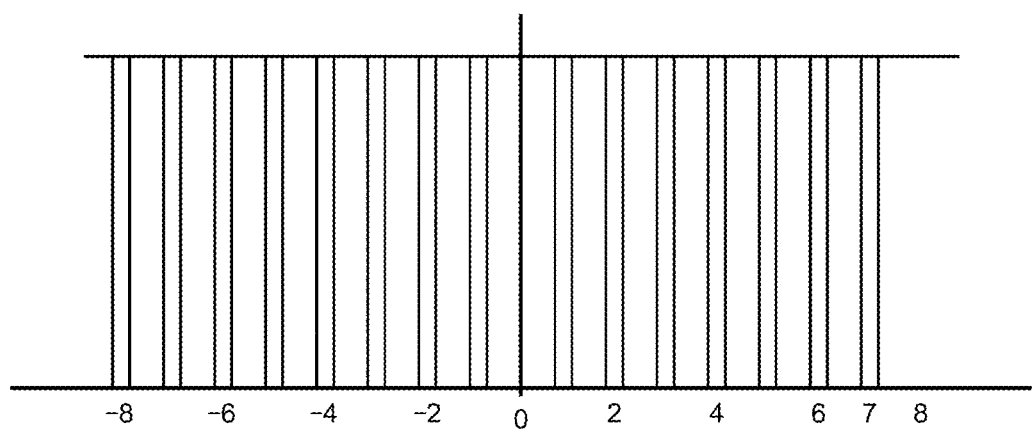
FIG. 7B is an explanatory diagrams showing processing examples of checking presence/absence of the spoofed signal by the position information processing according to an embodiment of the present invention.
Figure 7C:
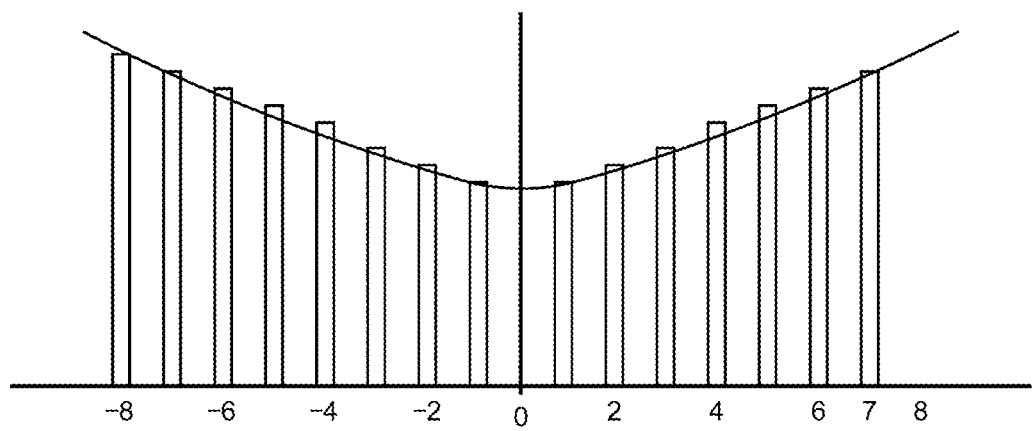
FIG. 7C is an explanatory diagrams showing processing examples of checking presence/absence of the spoofed signal by the position information processing according to an embodiment of the present invention.

On the other hand, in the case where the received signals include the signals other than the signals transmitted from the GPS satellite 2 (such as the signals output by the spoofer, the signals arriving from the outside and interfering with the signals transmitted from the GPS satellite 2, or jamming signals), since input signals become stronger than assumed signals (because the spoofer generally causes the apparatus to malfunction by outputting the signals stronger than the signals received from the GPS satellite), the gain of the AGC used when amplifying the IF signals before being digitized is saturated, and the histogram generated by the position information processing apparatus 10 becomes the almost same number at all possible values or becomes the smallest at the median to be a concave distribution as illustrated in FIG. 7B or 7C, and does not become the normal distribution shape.

The position information processing apparatus 10 performs the sanity check as described above for the respective IF signals of the GPS satellite 2 from which the signals are received, generates information indicating the result (information indicating whether the IF signals are clean (the signals other than the signals transmitted from the GPS satellite 2 are not included) or dirty (the signals other than the signals transmitted from the GPS satellite 2 can be included)) in real time, and records the information in the storage unit 14 together with the sequential information.

In such a manner, at every point of time of recording the sequential information, whether or not the position information included in the sequential information is generated on the basis of the dirty IF signals can be recorded together. In addition, on the basis of the records, for at least one GPS satellite 2, in the case where there are a plurality of IF signals determined as being received from the GPS satellite 2, that is in the case where the signals received from the GPS satellite 2 are dirty, the dirty record can be identified among the pieces of the position information generated on the basis of the dirty IF signals (the two or more pieces of the mutually different position information are obtained and recorded by the above-described processing), and the processing of performing the authentication processing respectively for the two or more pieces of the position information included in the dirty record, and selecting and outputting only the authenticated position information or the like can be executed.

Or, the position information processing apparatus 10 may, as already described, check whether the accepted signals are in the state where one signal each is received respectively from the individual GPS satellites 2 or the state where it is determined that the plurality of signals are received from at least one of the GPS satellites 2, depending on whether or not there are the plurality of peaks in the signal as the result of the coherent integration (the result of the incoherent synthesis in the case of performing the incoherent synthesis).

In this case, in the case where there are the plurality of peaks in the signal as the result of the coherent integration (the result of the incoherent synthesis in the case of performing the incoherent synthesis) corresponding to the signal of a certain specified GPS satellite 2, the position information processing apparatus 10 defines that the accepted signal includes a plurality of signals which are a signal transmitted from the specific GPS satellite 2 and another signal (it is determined that the plurality of signals are transmitted from one satellite), and records the information indicating that the IF signal is dirty (the signal other than the signal transmitted from the GPS satellite 2 can be included) in the storage unit 14 together with the sequential information. In the processing of recording the sequential information in this case, as already described, the position information (including the position information based on the satellite signal of the GPS satellite 2 or the like, and the position information based on the spoofed signal of the spoofer) from each of the plurality of taken-out navigation messages is recorded in correlation with the common time information and the accompanying information supplied from the other apparatuses.

In addition, as already described, when there are not a plurality of peaks in the signal as the result of the coherent integration (the result of the incoherent synthesis in the case of performing the incoherent synthesis), the position information processing apparatus 10 defines that the accepted signal includes only the signal transmitted from the GPS satellite 2, and records the information indicating that the IF signal is clean (the signals other than the signal transmitted from the GPS satellite 2 are not included) in the storage unit 14 together with the sequential information.

Note that, while the information indicating that the IF signal is clean is recorded together with the sequential information in the case where it is determined that the IF signal is clean (the signals other than the signal transmitted from the GPS satellite 2 are not included) here, in one example of the present embodiment, the information indicating that the IF signal is dirty may be recorded together with the sequential information only in the case where the IF signal is dirty, and only the sequential information may be recorded in the case that the IF signal is clean.

In addition, the position information processing apparatus 10 according to the example of the present embodiment can be utilized in the other moving bodies such as a vehicle or an airplane.

REFERENCE SIGNS LIST 1 position information processing system, 2 GPS satellite, 3 QZSS, 10 position information processing apparatus, 11 satellite signal receiving unit, 12 signal processing unit, 13 control unit, 14 storage unit, 15 interface unit, 16 transmitting/receiving unit, 20 center side apparatus, 31 accompanying information accepting unit, 32 position information accepting unit, 33 sequential information generation processing unit, 34 interpolation processing unit, 35 recording information generation unit, 36 output unit.

The invention claimed is:

1. A position information processing system including a position information processing apparatus and a center side apparatus,
wherein the position information processing apparatus comprises at least:
an accepting device configured to repeatedly accept sequential information including recording target information changeable with time, and including position information obtained using a satellite signal;
an interpolation processing device configured to hold the accepted sequential information corresponding to only the last N times (N being an integer equal to or larger than 2) of the acceptance, uses the first and the last of the held sequential information corresponding to the N times as a basis for prediction for predicting sequential information other than the first and the last information, and obtains a prediction value of the predicted sequential information on the basis of the sequential information used as the basis for the prediction by a predetermined interpolation operation,
a recording information generation device configured to, on the basis of comparison between the sequential information held by the interpolation processing device and the prediction value obtained by the interpolation, output either the sequential information correlated with time information, or information including the sequential information used as the basis for the prediction and prediction method specifying information that specifies a method for the interpolation operation, and
a recording device configured to record information output by the recording information generation device; and
the center side apparatus receives the information recorded by the position information processing apparatus, and authenticates the position information included in the received information.

2. The position information processing system according to claim 1,
wherein the information obtained using the satellite signal includes the position information and an encryption code, and
the recording device records, regarding the sequential information, the sequential information including the position information and the encryption code.

3. A position information processing apparatus comprising:
an accepting device configured to repeatedly accept sequential information including recording target information changeable with time, and including position information obtained using a satellite signal;
an interpolation processing device configured to hold the accepted sequential information corresponding to only the last N times (N being an integer equal to or larger than 2) of the acceptance, uses the first and the last of the held sequential information corresponding to the N times as a basis for prediction for predicting sequential information other than the first and the last information, and obtains a prediction value of the predicted sequential information on the basis of the sequential information used as the basis for the prediction by a predetermined interpolation operation,
a recording information generation device configured to, on the basis of comparison between the sequential information held by the interpolation processing device and the prediction value obtained by the interpolation, output either the sequential information correlated with time information, or information including the sequential information used as the basis for the prediction and prediction method specifying information that specifies a method for the interpolation operation, and
a recording device configured to record information output by the recording information generation device.

4. The position information processing apparatus according to claim 3,
wherein the information obtained using the satellite signal includes the position information and an encryption code, and
the recording device records, regarding the sequential information, the sequential information including the position information and the encryption code.

* * * * *